United States Patent [19]

Wells

[11] Patent Number: 4,462,307
[45] Date of Patent: Jul. 31, 1984

[54] HUMPBACK OVEN-BROILER

[75] Inventor: Harold D. Wells, St. Louis, Mo.

[73] Assignee: Pet Incorporated, St. Louis, Mo.

[21] Appl. No.: 496,912

[22] Filed: May 23, 1983

[51] Int. Cl.³ ............................................. A47J 37/04
[52] U.S. Cl. ...................................... 99/386; 99/400; 99/401; 99/443 C; 99/446; 99/447; 99/477; 99/482; 126/21 R; 219/388; 432/152
[58] Field of Search ...................... 99/386, 443 C, 401, 99/444, 446, 447, 400, 467, 477, 482; 432/152, 153; 219/388, 345, 400; 126/19 R, 21 R; 426/243, 523

[56] References Cited

U.S. PATENT DOCUMENTS

| | | | |
|---|---|---|---|
| 1,641,313 | 9/1927 | Bonaparte | 99/443 C |
| 2,529,253 | 11/1950 | Hoffman | 99/386 |
| 2,674,809 | 4/1954 | Meienhofer | 219/388 |
| 2,689,517 | 9/1954 | Angelus | 99/386 |
| 2,942,562 | 6/1960 | Luc | 426/243 |
| 3,449,546 | 6/1969 | Dhoble | 219/388 |
| 3,736,860 | 6/1973 | Vischer | 99/443 C |
| 3,802,832 | 4/1974 | Nicolaus | 99/443 C |
| 3,809,859 | 5/1974 | Wells | 219/345 |
| 3,993,788 | 11/1976 | Longenecker | 426/423 |
| 4,008,996 | 2/1977 | Wells | 126/19 R |
| 4,121,509 | 10/1978 | Baker et al. | 99/443 C |
| 4,152,631 | 5/1979 | Weinberg | 318/314 |
| 4,245,613 | 1/1981 | Wells et al. | 126/19 R |
| 4,366,177 | 12/1982 | Wells et al. | 99/447 X |

FOREIGN PATENT DOCUMENTS 736724 11/1932 France .............................. 99/443 C Primary Examiner—Billy J. Wilhite
Attorney, Agent, or Firm—Kalish & Gilster

[57] ABSTRACT

An oven-broiler of the humpback type includes a tunnel-form cooking chamber and a conveyor extending through it for conveying food products through the chamber for cooking of the products by emission of infrared radiation form the walls of the tunnel. An entrance and an exit are located at opposite ends of the chamber for continuous ingress and egress of the food products, with both entrance and exit being at a level lower than the chamber floor for causing the chamber to entrap a heated, oxygen-starved atmosphere in which flaming of the food products cannot freely occur. An elongated aperture extends along the bottom of the chamber for communication between the chamber and the external atmosphere. A control body, which may take one of different forms such as tubular, plate-form, or perforate, extends along the length of the aperture for controlling communication through the aperture. The control body has a surface positioned within the aperture below the conveyor for contact with grease or other liquids produced by cooking of the food products, providing a location for condensation and/or controlled flaming, dependent upon configuration.

23 Claims, 21 Drawing Figures

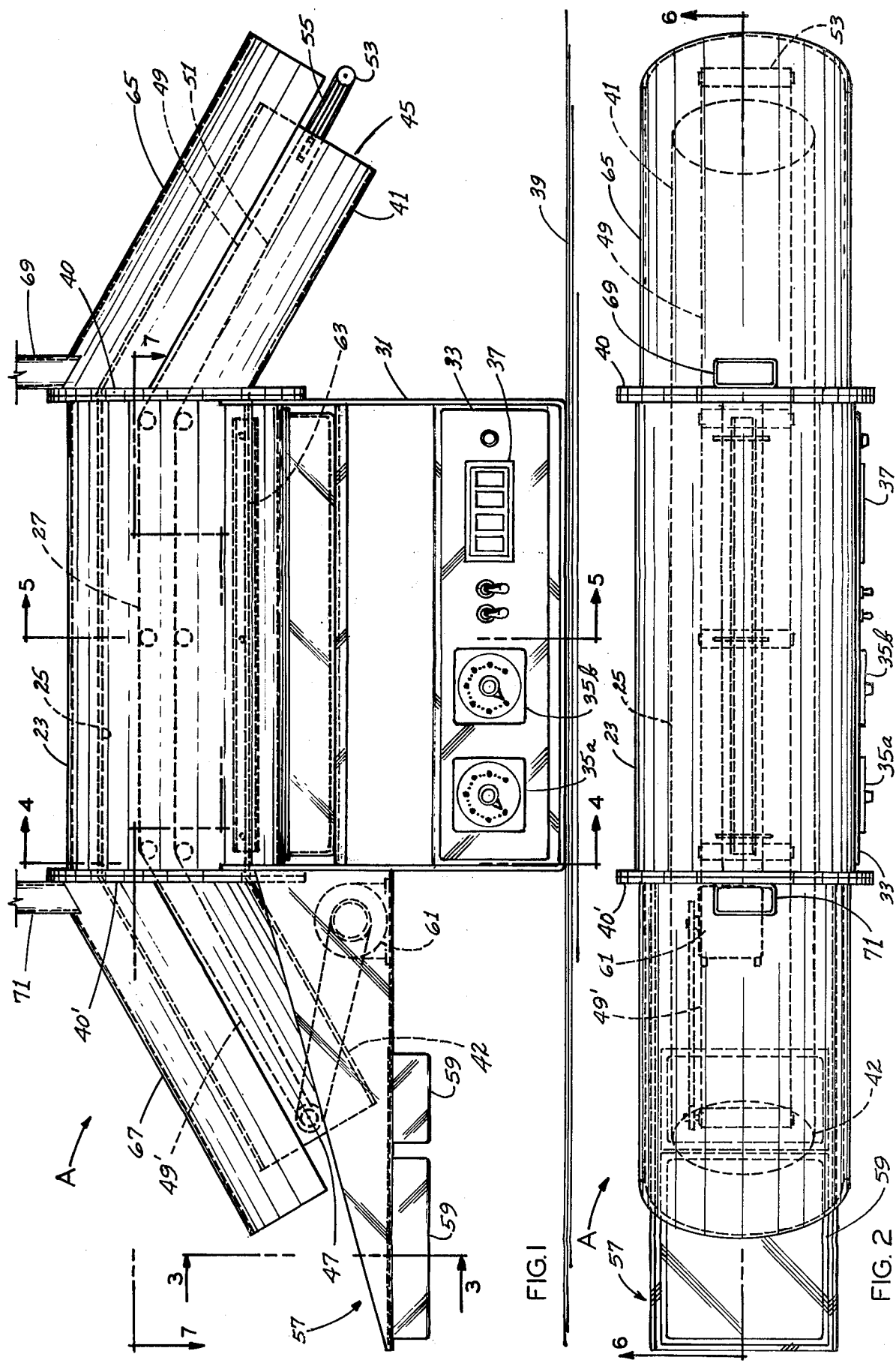

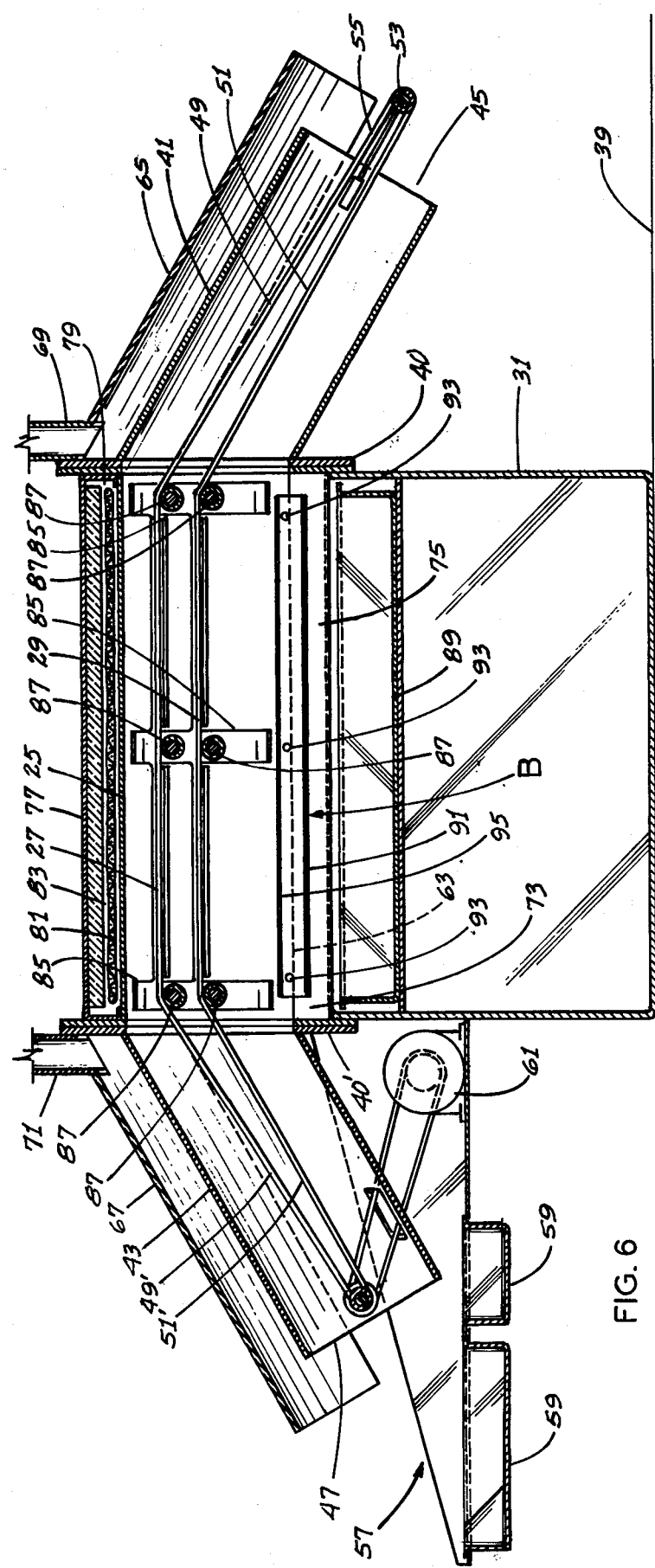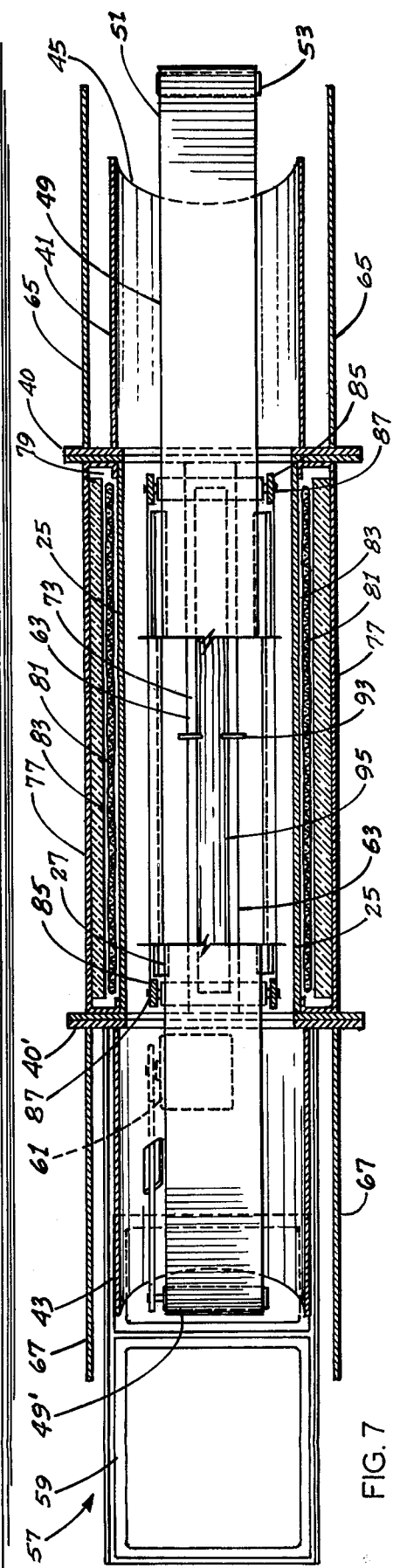
FIG. 6
FIG. 7

HUMPBACK OVEN-BROILER

BACKGROUND AND SUMMARY OF THE INVENTION

The invention relates to an improved tunnel oven-broiler of the humpback type wherein food products are heated by infrared radiation as they are conveyed through a tunnel-form cooking chamber.

It is expected in restaurant, industrial and institutional cooking that greasy foods, and particularly meat products such as hamburgers, steaks, chops, etc., will tend to flare up and char as grease rendered by the food catches on fire, as will occur when exposed to temperatures sufficient for broiling, for example. This is particularly so for beef, pork, and lamb, but also occurs with fowl, including chicken, turkey, and duck.

Either limiting or avoiding such flaming or flaring up of greasy foods can be extremely difficult since meat grease, for example, may begin vaporizing at only about 150° F. Therefore, the exposure of grease vapors to the ordinary atmosphere at even the modest temperatures present in ovens and broilers is likely to produce combustion.

If such flaring or flaming of meat and grease in an oven of the present character is not controlled, there is difficulty, if not impossibility, of accurately maintaining temperature control. This is because the flames and flaring up cause improper response by temperature sensing elements not indicative of the true temperature in the oven.

In recent years, tunnel ovens have been developed for use in the fast food and industrial cooking field, such as disclosed in Wells U.S. Pat. No. 4,008,996. Ovens of this type cook by infrared emission from internal services of the tunnel-form cooking chamber. Such tunnel ovens have provided a revolutionary way of cooking which preserves the taste, succulence and moisture of food products. They do not utilize heated air for cooking, which tends to dry out food.

In the genesis of ovens of the present type, it has been proposed, as in Wells et al U.S. Pat. No. 4,366,177, to provide a method of substantially flameless broiling in an oven of the type which has come to be known as having a humpback configuration. In a humpback oven, the cooking chamber is configured so that the opening and exit to the tunnel-formed chamber is positioned lower than the floor of the chamber for entrapping a heated, oxygen-starved atmosphere. The food products are conveyed up an inclined path into such atmosphere where they are heated to temperatures at which they otherwise would flame but, because of the denial of oxygen, may cook or be broiled in a substantially flameless manner. The cooked food products are moved continuously through such atmosphere and are delivered by being conveyed down an inclinded path.

Unexpectedly, a problem was discovered in such cooking arrangement, in that the cooking, when carried out in a totally flameless manner within a totally entrapped oxygen-starved atmosphere, tended over a period of time to build up in the entrapped atmosphere grease vapors and smoky constituents of the broiling process. As a consequence, the introduction of cold, uncooked articles of meat entering the oven was found to result in condensation on the cold meat surfaces of grease vapor and smoky products of the broiling process, imparting an undesirable taste to the cooked product.

Because of these problems, the present invention previously has proposed to permit a certain amount of slight but tightly controlled grease combustion to occur in the humpback-configuration oven-broiler in order to permit conversion or oxidizing reaction with the vapor or smoke constituents within the oven atmosphere to prevent such products from being deposited on the meat.

Additionally, the inventor has discovered that there is a continuing demand by restaurant customers for what is termed "char-broiled" meat products, which is to say, meat products broiled with at least some impingement of flame upon the product to impart a slightly carbonized taste like that resulting from broiling over an open charcoal fire upon which the dripping of grease over an open charcoal fire upon which the dripping of grease as it is rendered from the product will drip and flare up, causing flames to lick at the meat.

Accordingly, when one seeks to make commercially-successful use of a tunnel oven of the present type, one is confronted with the need to provide an oven which allows the user to achieve a delicate balance of maintaining, on the one hand, rather high broiling temperatures which are relatively precisely maintained with, on the other hand, permitting a small amount of grease from the meat products to be burned so that a slight flame impingement for sizzling of the meat with what amounts to combustion of the grease can occur. At the same time, the oven must not permit the undesirable above-noted accumulation within the oven atmosphere of smoky combustion products and grease vapor which, together with moisture emanating from the cooked meat product, produces a vapor-saturated oven atmosphere which would condense upon the meat products and leave an undesirable bitter taste.

Accordingly, it is an object of the present invention to provide an improved oven or so-called oven-broiler of the humpback type which permits broiling of meat products to be carried out in a relatively quiescent, substantially trapped atmosphere but wherein there is not permitted uncontrolled burning or flaring up of meat and wherein a small and unobjectionable degree of flame impingement is permitted, if desired.

It is similarly an object of the invention to provide such an oven-broiler wherein the grease and moisture vapors within the cooking atmosphere are condensed out and permitted to drain from the oven tunnel or chamber before they can become deposited upon the meat product.

Another object of the invention is to provide an oven-broiler wherein there is a controlled interchange of the atmosphere within the cooking tunnel with that exteriorly of the chamber while maintaining a trapped, somewhat oxygen-starved atmosphere within the tunnel.

An object of the present invention is also to provide an oven-broiler of the character stated wherein certain novel effects can be achieved such as, for example, the introduction of smoking or flavoring elements (such as through the use of wood chips or the like) into the cooking tunnel during cooking.

A further object of the invention is the provision of such an oven-broiler which permits relatively precise and effective control over the communication between the atmosphere in the cooking chamber and that exteriorly of it; which permits rapid reconfiguration of the oven structure for such purposes; which is rapidly and easily cleaned as by the use of a self-cleaning cycle; and from which the oven components may be rapidly removed for their separate cleaning.

An object of the present invention additionally is to provide such a tunnel oven-broiler in which greasy food products such as steaks and chops may be rapidly and effectively cooked at the relatively high temperatures especially desirable for broiling but without concern for the steaks or chops being excessively burned or undesirably exposed to the excessive impingement of flame; and in which such food products can be continuously supplied to and delivered from the cooking tunnel at relatively high volumes and rates while the tunnel entrance and exit openings remain open.

It is an object of the present invention to provide such a tunnel oven-broiler which avoids loss of temperature control within the tunnel during cooking which otherwise could result from flaming and flaring, and in which the oven temperatures can be maintained sufficiently precisely and accurately to provide an even, complete and consistent cooking of the food product.

A further object of the present invention is to provide such an oven-broiler which by its humpback configuration avoids wasteful escape of thermal energy and with consequent increase of efficiency.

Another object of the invention is to provide an oven-broiler of such configuration which allows relatively less skilled personnel to carry out broiling of food products more precisely and to a greater degree of uniformity of result than has been possible with other types of ovens.

It is additionally an object of the present invention to provide such a tunnel oven-broiler which can be relatively economically and simply manufactured, and which is reliable and of extremely durable, long-lasting configuration, as well as being well suited for heavyduty volume commercial usage.

Briefly, the invention is concerned with an oven-broiler of the humpback type including a tunnel-form cooking chamber and a conveyor extending through it for conveying food products through the chamber for cooking of the products by emission of infrared radition from the walls of the tunnel. The oven-broiler includes structure defining an entrance and an exit at opposite ends of the chamber for ingress and egress of the food products. The entrance and exit are each located at a level lower than the chamber for causing the chamber to entrap a heated, oxygen-starved atmosphere in which flaming of the food products cannot freely occur. In accordance with the invention, the oven structure is configured to define an elongate aperture extending along the bottom of the chamber for providing communication between the chamber and the external atmosphere. Control means is provided being associated with the aperture, for controlling the nature of the oven chamber atmosphere by controlling the communication through the aperture, and such means preferrably takes the form of one of several types of bodies including a control surface positioned within the aperture below the conveyor for contact with grease or other liquids produced by cooking of the food products.

Other objects and features will be in part apparent and in part pointed out in the following description.

BRIEF DESCRIPTION OF THE DRAWINGS

FIG. 1 is a side elevation view of a humpback oven configured in accordance with and embodying the present invention.

FIG. 2 is a top plan view of the new oven.

FIG. 6 is a longitudinal cross-sectional view taken generally along line 6—6 of FIG. 2.

FIG. 7 is a horizontal cross-sectional view taken generally along line 7—7 of FIG. 1.

Corresponding reference characters indicate corresponding parts throughout the several views of the drawings.

DESCRIPTION OF THE PREFERRED EMBODIMENT

Figure 5:
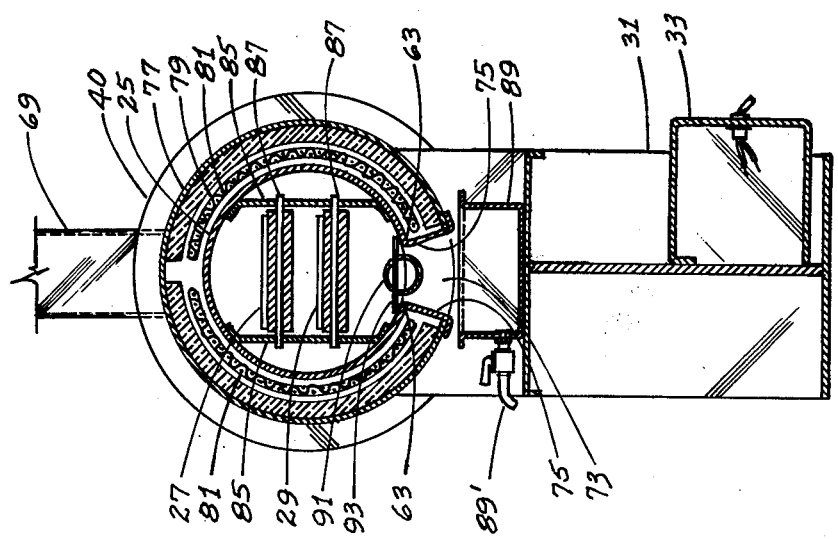
FIG. 5 is a similar transverse cross-sectional view of the oven, but taken generally along line 5—5 of FIG. 1.
Figure 4:
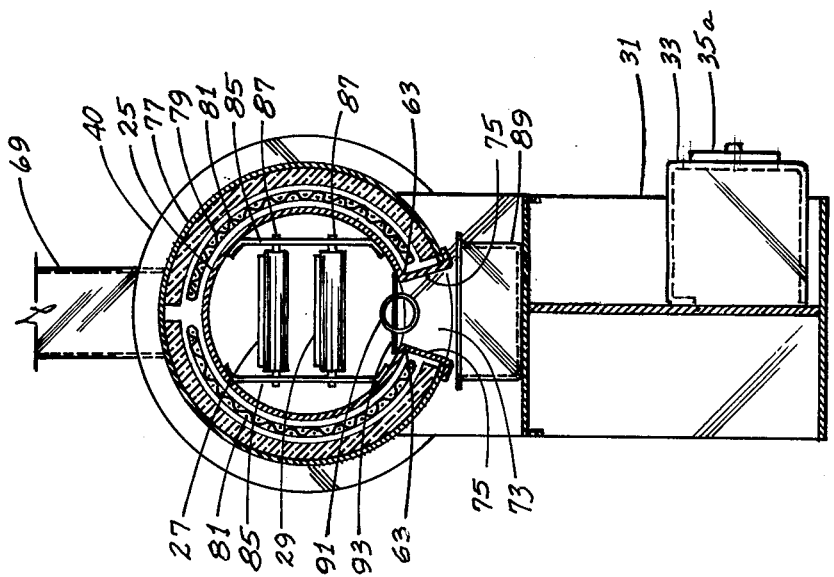
FIG. 4 is a vertical transverse cross-section view taken generally along line 4—4 of FIG. 1.
Figure 3:
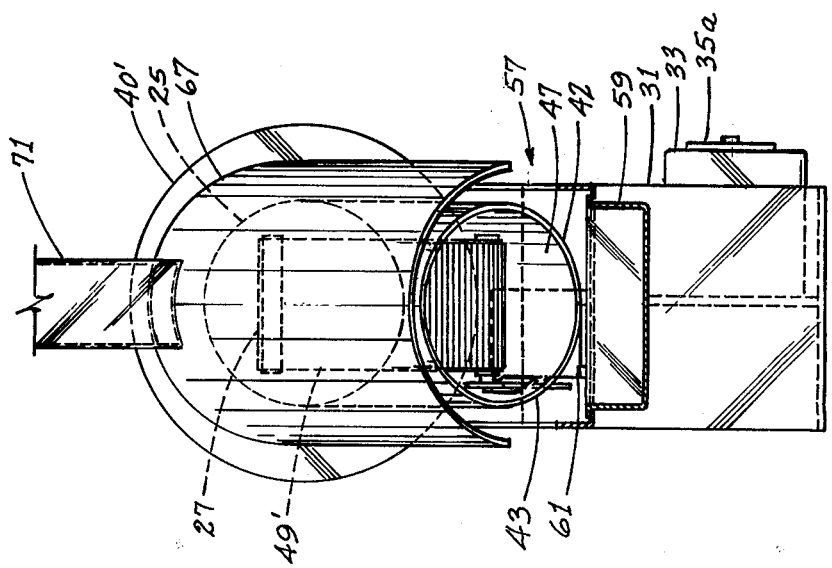
FIG. 3 is a left end elevation view, partly in section, as taken generally along line 3—3 of FIG. 1.

Referring now by reference characters to the drawings, and particularly to FIGS. 1 and 2, designated generally at A is an oven-broiler of the invention. The new oven-broiler, which may be referred to herein simply as an oven or as a broiler, is of the type which is referred to as being of humpback configuration, wherein a central portion or section 23 of the oven contains within it a tubular tunnel-form cooking chamber 25 of horizontal, rectilinear configuration, through which pass upper and lower reaches 27, 29 of an endless chain or link belt-type conveyor for conveying of food products through the chamber 25 for cooking of the food products by the emission directly from the walls of chamber 25 of infrared radiation.

It will be understood that the new oven A is intended primarily for the broiling of food products, such as steaks, chops and other cuts of meats, whether beef, pork, lamb, fowl or other meat products, which render grease during the cooking, as well as tending to release moisture and meat drippings during cooking and which may result in the creation of steam and grease vapors as well as other smoky products of the broiling process. Typical of these kinds of foods are beefsteaks and hamburgers, which contain by volume a substantial percentage of fat which, upon heating, is rendered as drippings from the meat. These drippings ordinarily would tend to flare up and produce a product-charring flame when exposed to temperatures sufficient for broiling.

Broiler A may be of relatively compact configuration wherein the tunnel-form chamber 25 is of a few inches in diameter, being fully enclosed within the central section or unit 23 which is itself of generally horizontal disposition, being seated upon a central base 31 including a control panel 33 provided with individual temperature controls as at 35a, 35b for individually preselecting upper and lower temperatures to be provided by proportional or other known temperature-anticipating control methods utilizing electric heating elements contained within section 23. Such heaters cause the interior surface of chamber 25 to become heated for providing direct emission from such surfaces of infrared radiant energy. Their energy radiates toward the center of the chamber from the large cross-sectional surface area thus provided for direct absorption by food products being conveyed through the chamber. Controls also may include a time setting control 37 for preselecting the actual time in minutes and seconds for travel of food products through chamber 25.

Base 31 may be directly seated upon a table top or counter 39 for convenient location of the oven for use within a restaurant or other commercial location where the new oven is utilized.

Extending from opposite ends of the center section or unit 23 and secured to end flanges 40, 40' are sloping entrance and exit sections 41, 42, respectively, each of tubular configuration for providing an entrance 45 and an exit 47. Inclined upper and lower reaches 49, 51 of the conveyor extend upwardly through tubular extension 41, passing around a sprocket or sprockets at the outer end, as at 53, to provide an exposed upper reach portion 55 constituting a loading station at which food products may be placed for being conveyed upwardly at an inclined angle (which typically may be 30°–45°) into the oven chamber 25. The food products then continuously travel along the horizontal reach 27 therein and then down an inclined reach 49' within section 43, which also is of tubular character, for delivery through the exit 47 to a delivery station 57. At station 57, there may be located one or more serving or storage pans 59. A suitable motor 61 such as of the speed-controlled, electronically driven type, powers the endless conveyor.

Both entrance 45 and exit 47 are located with their upper extent each lower than the lowermost point or floor 63 of chamber 25. Both remain open at all times during broiling or other cooking of food products, which are continuously fed to the oven through entrance 45 for continuous delivery at station 57. Seated over extensions 41, 42 are semi-circular shrouds 65, 67 which are inclined and conform to the general configuration of the respective extensions but which extend actually over both the entrance and exit 45, 47 for receiving smoke or other gases which may escape or be forced during broiling from the entrance or exit. Corresponding flues or exhaust ducts 69, 71 extend upwardly from the upper ends of the shrouds for carrying away the smoke, gases or fumes.

Referring primarily to FIGS. 4–7, there is provided within chamber 25 along its length a rectangular elongated aperture 73 which may be formed by constructing chamber 25 in the form of a continuous rolled single sheet of steel or high temperature stainless steel which is formed to provide a pair of outwardly directed radial flanges 75. These flanges permit chamber 25 to be connected to and located concentrically within a metal outer shell 77, also of circular configuration. This arrangement defines an annular space 79 in which are located composite electric heaters 81 which lie against the outer wall of chamber 25, there being a blanket of commercially available alumina-silica refractory material for thermally insulating the outer shell 77. The conveyor reaches may be suitably supported within chamber 25 by any suitable structure such as the vertical braces 85 and horizontal supports or guides 87.

Referring to FIGS. 6 and 7, aperture 73 is of rectilinear orientation and parallel along its longitudinal extent with the approximate center line of chamber 25. The aperture extends substantially the entire length of chamber 25, being located in a position of alignment below conveyor reaches 27 and 29 so as to be immediately below any food products as they are carried along the upper reach 27 during travel through chamber 25. Further, the width of aperture 73 is slightly less than the width of the conveyor, being substantially less than the inside diameter of chamber 25.

Aperture 73 provides direct communication between the trapped, heated atmosphere within the oven chamber or tunnel 25 and the normal atmosphere exteriorly of chamber 25. There is positioned, however, below aperture 25 a trough, tray or pan 89 which extends the entire length of aperture 73 for receiving drainage of grease or other condensed liquids from aperture 73 during use of the oven. As presently shown, tray 89 may be provided with a drain valve 89' for continously or selectively draining off the drained grease and other liquids.

In accordance with the invention, a number of different possible control bodies B are removably situated centrally along the length of aperture 73 for controlling the extent and character of the communication between the oven and exterior atmosphere provided by aperture 73.

In this regard, aperture 73, being located only in the bottom of the oven chamber, does not permit the ready escape of trapped, heated air which tends to rise and remain trapped within the oven chamber with a slight or incipient overpressure at all times during use, being relatively quiescent, just as a hot air balloon will entrap rising, heated air from its gas burner. However, in the new oven, heating of the air within the chamber rather than externally is a natural consequence of the direct emanation of infrared energy from the heated oven walls into the oven chamber and because of the inevitable contact of the entrapped air with the chamber walls.

Because both entrance 45 and exit 47 are situated so that even their uppermost margins are below the lowermost point or floor 63 within the chamber 25, the heated air also is not permitted to escape through the always-open entrance and exit, except to the extent it may be forced out. On the other hand, the size and extent of aperture 73 provides a relatively large area through which there may be exchange of heat, as by radiation across the resultant temperature differential or gradient across the aperture except to the extent limited by the aforementioned control body B. Also, to a limited extent, there may be some physical interchange of the exterior and interior atmosphere in the very region of aperture 73.

FIGS. 8–21 illustrate various possible control bodies B of the invention which may be placed along the length of aperture 73 not only for partially blocking the aperture but also for achieving various other purposes of the invention.

Generally speaking, such control body B will define an upwardly facing control surface, i.e., one facing toward the interior of the oven chamber yet positioned always below the conveyor reaches within chamber 25 whereby such surface will receive dripping grease and other liquids produced during cooking of the food products.

Control body B may take any of various forms. Thus, in FIG. 6, there is shown a cylindrical tubular control body 91 of diameter slightly less than the width of aperture 73 and extending nearly entirely the full length of the aperture. Body 91 is supported by a plurality of radially extending pins or rods 93 which rest upon the ledge or lower portion 63 of the oven chamber immediately adjacent aperture 73. The outer surface 95 of control body 91 is thus cylindrical or generally convex, relative to the oven chamber.

A control body such as that designated at 91 serves not only to partially block aperture 73 but also its surface 95 provides a condensation surface for condensing of vapor produced during heating of the food products, as well as being a drip-catching surface for receiving drippage of grease or other liquids produced by cooking of the food products. Additionally, the convex or cylindrical nature of the control body 91 redirects infrared energy back upwardly into the oven to minimize the amount of energy which might otherwise be radiated outwardly from the oven chamber through aperture 73 in a lossy manner.

Since the control body 91 is exposed not only to the high temperatures within the oven chamber but also to the nearly normal room temperatures of the external atmosphere, the control body will tend to develop across it a substantial temperature differential so that condensation of vapors present in the cooking chamber during cooking may condense on at least lower portions of the control surface 95. Thus, it will be seen that control surface 95 also provides a condensation surface for condensing of vapor produced during heating of the food products.

The dimensions of control body B and its form may vary greatly dependent upon the type of products to be cooked and the temperatures to be utilized in the oven. For example, the cooking temperatures (i.e., the temperatures of the inner walls of chamber 25) may vary from a few hundred degrees to possibly 1200° F. or even more although more typically may range from about 600° to about 1150° F. for broiling. The width of aperture 73 may typically be about three inches while the diameter of a control body B such as of the tubular form 91 shown in FIGS. 6 and 7 may be approximately two inches, although its diameter may be lesser or greater to achieve gaps of desired spacing at opposite sides of the control body between the adjacent edges of the aperture 72. Such spacing may be varied over a desired range, such as ⅛ inch, ¼ inch, ½ inch, etc. The diameter or width of control body B need not necessarily be uniform or consistent. Thus a cylindrical form having an irregular surface may be substituted. Or a control body B of tapering nature, e.g., wide at one end and narrow at the other.

In operation, the user of oven A will employ a control body B of preselected dimensions for achieving a spacing on the sides of the control body, or otherwise to achieve a limiting of the area provided through aperture 73 as partially blocked by control body B for achieving a desired degree of controlled, selective burning of the rendered grease upon the upwardly-directed control body surface which will permit the food products to receive a slight but customer-preferred charring or singeing to impart a char-broiled character to the cooked meat product upon delivery.

Furthermore, dependent upon the amount of moisture and other vapors, including smoke, produced by the particular meat products to be cooked, the user may prefer more or less moisture to be condensed from the oven in order to control the degree of build-up of such constituents within the oven chamber during cooking, bearing in mind that an excessive build-up of same will invite the possibility that cold meat products being delivered to the oven through entrance 45 will themselves condense the smoke and water vapor in the oven. Such in situ condensation, if excessive, can result in the cooked product having a bitter or unpleasant taste.

Therefore, in addition to controlling the oven chamber atmosphere by limiting the escape of heat, limiting the interchange of the oven and external atmospheres, and condensing moisture, a control body B of the invention makes possible cooking products with the degree of singeing or flame impingement which may be sought by the user to satisfy customer demand for a char-broiled product.

Figure 8:
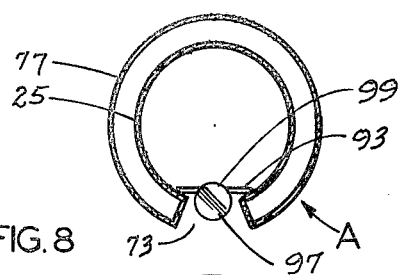
FIGS. 8 and 9 are together a simplified cross-section of the oven and perspective view of a control body of a first configuration utilized in the oven wherein the control body is of a tubular, perforate nature.
Figure 9:
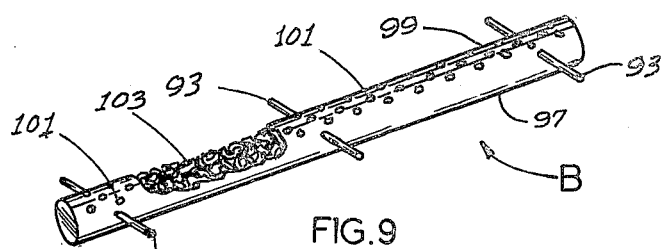

Other possibilities of the invention are appreciated by reference to FIGS. 8 and 9, wherein a control body B is illustrated which takes the form of a closed-end cylindrical tube 97 provided along its length with the above noted radial support extensions 93. The upper surface 99, being the control surface of the device, is provided with numerous small openings 101. Tube 97 is filled with chips 103 of charcoal, hardwood, mesquite or any of a number of different possible flavoring agents or smoke-producing agents for being released through the openings 101 when tube 97 is heated when occupying its central position within aperture 73 as shown in FIG. 8. Thus, for example, tube 97 may be utilized to provide a hickory smoked effect when char-broiling or during the preparation of ribs and other meat products.

Figure 10:
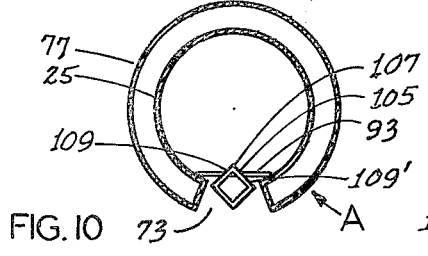
FIGS. 10 and 11 are similar views illustrating a control body of rectangular-section character.
Figure 11:
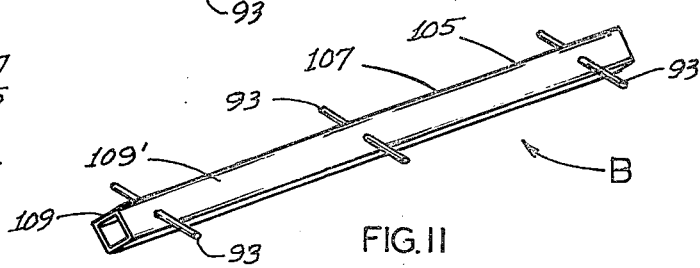

FIGS. 10 and 11 illustrate the provision of a control body B in the form of a rectangular section length of tubing 105 provided with extensions 93 extending in an orientation causing the tubing 105 to occupy a position with a corner edge 107 directed upwardly toward the interior of chamber 25 so that two walls 109, 109′ become the control surface of the device against which grease and liquids will drop when food products are conveyed through the oven. Such surfaces or walls 109, 109′ readily reflect infrared energy directed against them.

Figure 12:
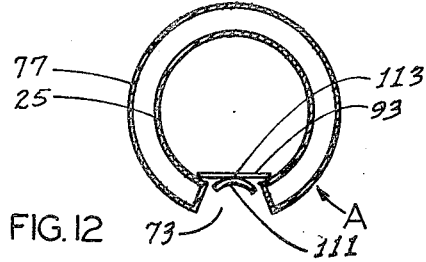
FIGS. 12 and 13 are similar views illustrating a control body of semi-circular curved plate configuration.
Figure 13:
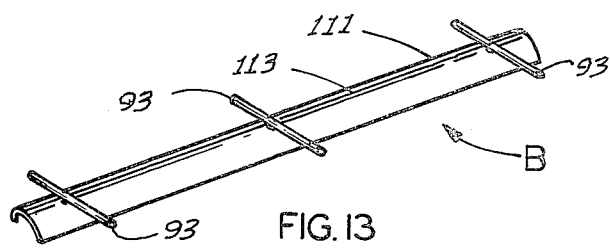

FIGS. 12 and 13 demonstrate that control body B may take the form of a length of material 111 which is of semi-circular cross-section, the radial supports being secured to the upper surface 113 of element 111 which latter surface provides the control surface hereinabove noted.

Figure 14:
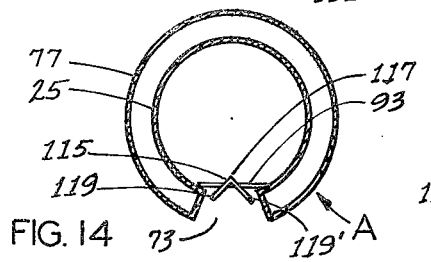
FIGS. 14 and 15 are similar views illustrating a control body of roof-section configuration.
Figure 15:
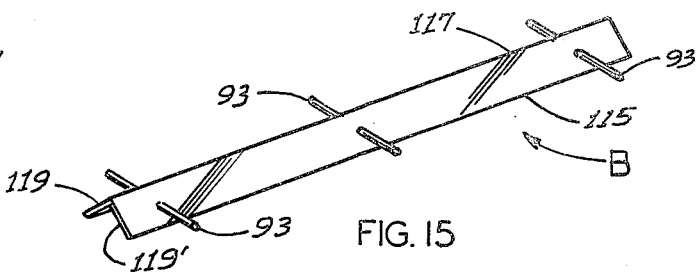

In FIGS. 14 and 15, a length of material 115 having a cross-section of roof-like character is demonstrated whereby a sharp edge or corner 117 is directed upwardly to provide flat control surfaces 119, 119′ on opposite sides.

Figure 16:
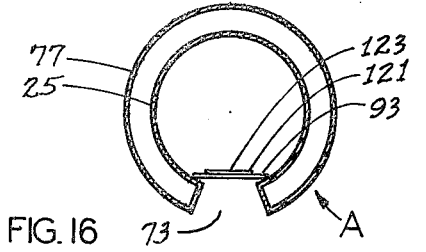
FIGS. 16 and 17 are similar views illustrating a control body of flat, plate-like character.
Figure 17:
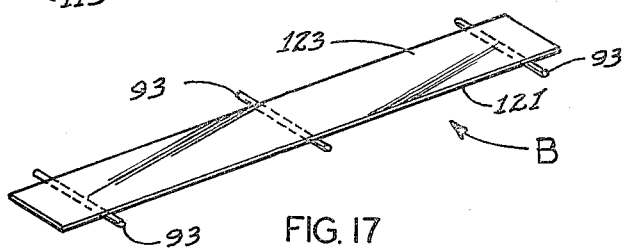

FIGS. 16 and 17 reveal the provision of a flat plate 121 for use as control body B. Plate 121 more receives and distributes grease being rendered during the cooking process for providing an enhanced burning of the produced grease and a greater flame impingement effect. Such plate 121 may alternatively be slightly dished or include an upwardly directed lip around its edges for still further enhancement of its grease capturing tendency. However, as will be apparent, relatively little condensation of water vapor will result from a use of control body B of the configuration shown in FIG. 17, since the control surface 123 tends to remain quite hot during cooking.

Figure 18:
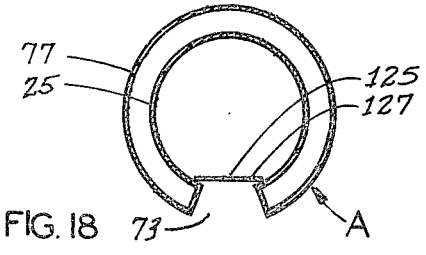
FIGS. 18 and 19 are similar views illustrating a flat control body of perforate or screen-like character.
Figure 19:
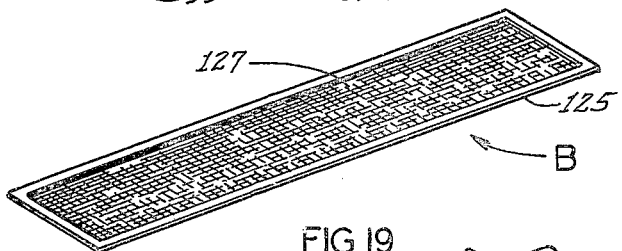

In FIGS. 18 and 19, the control body B takes the form of a screen or plate 125 having either a mesh 127 or other perforate surface provided with closely spaced openings for serving as the control surface of the invention. Such plate 125 increases the communication between the interior and exterior atmospheres while permitting grease striking the surface 127 to be selectively burned for a flame impingement effect.

Figure 20:
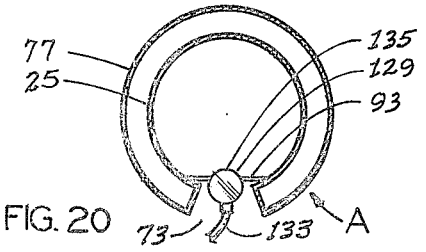
FIGS. 20 and 21 are similar views illustrating the use of a control body of cylindrical, liquid-cooled character.
Figure 21:
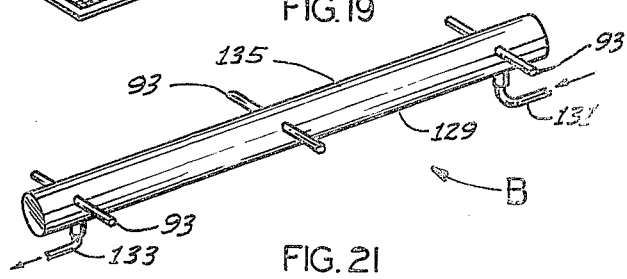

FIGS. 20 and 21 are illustrative of the use of a control body of a cylindrical liquid-cooled character wherein a closed end tube 129 is utilized, and to which a cooling liquid such as water is supplied at one end by a fluid line 131 and withdrawn from the other end by a fluid line 133. The control surface 135 of the entire tube 129 is caused by the cooling liquid circulation to be far cooler than would be the case of a control body such as elements 91 or 97. Thus, cooled tube 129 will produce very substantial condensation but will almost entirely if not completely eliminate the combustion of grease rendered from the food products which falls upon its upwardly directed control surface 125.

It will therefore be apparent that the user of the new oven A has the possibility of selecting a control body B for use with oven A which provides a trapped, heated and oxygen-starved atmosphere within the oven chamber 25 for producing broiling or other heating of food products according to the user's desire. Therefore, the user may choose to operate oven A so that it will provide broiling of meat products with little or no impingement of flame upon the product and yet causing heavy condensation upon control body B of smoke and water vapor within the oven atmosphere, whereby the food product entering chamber 25 will not itself become the source for in situ condensation of a type which would render the taste of the cooked food product unacceptable. Alternatively, the user may prefer to provide for substantial flame impingement by the use of an embodiment of control body B which permits the grease dripping from the cooking meat product to fall upon a hot control surface of control body B which will permit the flames to lick and singe the product, the degree of condensation from the oven atmosphere being also a matter of choice dependent upon the configuration of the control body B preferred.

The use of support extensions of the type designated 93 permits control body B to be easily installed within aperture 73 or removed therefrom either for replacement purposes (as with a control body B of different configuration) or for cleaning. Such an arrangement permits simple and quick withdrawal of the control body B from oven A for separate cleaning. However, the control body B may remain in place to permit the oven to be cleaned by the use of a self-cleaning mode in which a removable plug may be inserted into both the opening 45 and exit 47 whereby, with the oven heating units energized for producing a high emission temperature within the oven, the trapped air will rise to the high levels appropriate for carbonization and pyrolysis, as desired for producing self-cleaning.

A control body B of the invention may most preferrably be of a steel or stainless steel although alloys, plated and/or coated metals, including ceramics, and composite structures may be employed. It is also within the purview to employ a control body B which is of an igneous character, such as lava, stone or pumice, or other glassy or synthetic materials may be employed. Various coatings for producing novel effects, such as flavor or smoke-producing agents, may be employed, as may be coatings of catalytic character.

Accordingly, it is seen that the various objects of the invention are attained and other advantageous results are achieved by the invention.

Although the foregoing includes a description of the best mode contemplated for carrying out the invention, various modifications are contemplated.

Since various modifications can be made in the constructions and methods herein described and illustrated without departing from the scope of the invention, it is intended that all matter contained in the foregoing description or shown in the accompanying drawings shall be interpreted as illustrative rather than limiting.

What is claimed is:

1. An oven-broiler of the humpback type including a tunnel-form cooking chamber and a conveyor therein for conveying food products through the chamber for cooking of such products by infrared radiation, the oven-broiler having structure defining an entrance and an exit at opposite ends of the chamber for ingress and egress, respectively, of food products relative to the chamber, the entrance and exit being each located at a level lower than the chamber for causing the chamber to entrap a heated, oxygen-starved atmosphere and characterized by the oven structure including means for defining an elongate aperture along the bottom of the chamber for providing communication between the chamber and an atmosphere external to the chamber, and control means associated with said aperture for controlling the nature of the oven chamber atmosphere by controlling said communication.

2. An oven-broiler according to claim 1 and further characterized by said control means including a control surface providing a condensation surface for condensing of vapor produced during heating of the food products.

3. An oven-broiler according to claim 1 and further characterized by said control surface being located beneath said conveyor for providing a drip surface for receiving drippage of grease and other liquids produced by cooking of the food products.

4. An oven-broiler according to claim 3 and further characterized by said control means having a surface positioned below said conveyor for providing a combustion region for selective burning of the produced grease.

5. An oven-broiler according to claim 1 and further characterized by said control body having an elongate form and conforming to said aperture, said control body partially blocking the aperture.

6. An oven-broiler according to claim 5 and further characterized by said control body having a characteristic dimension less than the width of said aperture and being located within said aperture for defining on opposite sides of the control body gaps with the side edges of said aperture of predetermined gap spacing.

7. An oven-broiler according to claim 5 and further characterized by means removably supporting said control body in a position located centrally within said aperture along the center line of the aperture, and said aperture and control body being of complementary configuration, the control body conforming to the aperture, said supporting means comprising a plurality of projections extending in opposite directions from the control body for engaging the oven structure to suspend the control body centrally within the aperture, the control body being readily removable from its central position within aperture.

8. An oven-broiler according to claim 1 and further characterized by said chamber having a substantially horizontal extent and being of tubular configuration, said elongate aperture extending longitudinally along at least a major portion of said horizontal extent but opening only into the bottom of the chamber, the aperture having a length along the chamber which is substantially less than the aperture width, said control means comprising an elongate control body positioned within the aperture and extending longitudinally along at least a major portion of the aperture, the control body having a character for partially blocking said aperture, and including a control surface oriented below said conveyor for contact with grease or other liquids produced by cooking of the food products, said surface being oriented for facing toward the interior of said chamber below said food products and serving as the location for controlled flaming of grease produced during said cooking.

9. An oven-broiler according to claim 8 and further characterized by grease receiving means oriented below said control body for receiving drainage of grease and other liquids from said aperture.

10. An oven-broiler according to claim 8 and further characterized by said control body being of tubular configuration.

11. An oven-broiler according to claim 10 and further characterized by said control body being closed at opposite ends, and means for supplying a cooling fluid to the interior of the central body for causing increased condensation upon the surfaces of the control body.

12. An oven-broiler according to claim 10 and further characterized by said control body being closed at opposite ends and having perforate surfaces, the interior of the control body being filled with a smoke or flavoring substance.

13. An oven-broiler according to claim 10 and further characterized by said control body being of circular cross-section.

14. An oven-broiler according to claim 10 and further characterized by said control body being of rectangular cross-section.

15. An oven-broiler according to claim 8 and further characterized by said control body being of plate-like character.

16. An oven-broiler according to claim 15 and further characterized by said control body being of curved cross-section.

17. An oven-broiler according to claim 15 and further characterized by said control body being of roof-like cross-section.

18. An oven-broiler according to claim 15 and further characterized by said control body being of flat cross-section.

19. An oven-broiler according to claim 8 and further characterized by said control body being of perforate character.

20. An oven-broiler according to claim 8 and further characterized by vent means proximate each of the entrance and exit for withdrawing smoke and vapors produced within the chamber during cooking of the food products.

21. An oven-broiler according to claim 20 and further characterized by the vent means comprising shrouds at each end of the oven for at least partially enshrouding and extending beyond the entrance and exit for receiving smoke and vapors escaping from the entrance or exit, respectively, and conduit means for carrying such smoke and vapors away from said shrouds.

22. An oven-broiler of the humpback type including a tunnel-form cooking chamber and an endless conveyor therein for conveying food products through the chamber for cooking of such products by infrared radiation, the cooking chamber being of tubular form, the oven-broiler having end extensions which extend from opposite ends of the tubular form cooking chamber for defining an entrance and an exit at the outer opposite ends of said extensions for ingress and egress, respectively, of food products relative to the chamber, the entrance and exit being each located at a level lower than the chamber for causing the chamber to entrap a heated, oxygen-starved atmosphere and characterized by the oven structure including means for defining an elongate aperture along the bottom of the chamber for providing communication between the chamber and an atmosphere external to the chamber, a control body having an elongate form and conforming to the aperture, the control body partially blocking the aperture for controlling the nature of the chamber atmosphere by controlling the nature and extent of the communication between the chamber and the external atmosphere, the control body being in a position located within the aperture along the center line of the aperture and including means for engaging the oven structure to maintain the control body within the aperture, the control body being readily removable from its position within the aperture, the control body including a control surface oriented below the conveyor for contact with grease or other liquids produced by cooking of the food products, the control surface being oriented for facing toward the interior of the chamber below the food products and serving as a location for controlled flaming of grease produced during cooking of the food products or for providing a condensation surface for condensing of vapor produced during heating of the food products, grease receiving means oriented below the control body for receiving drainage of grease and other liquids, including condensed fluids, from the aperture and control body, and vent means proximate the entrance and exit for withdrawing smoke and vapors produced within the chamber during cooking of the food products and escaping from the entrance or exit, respectively.

23. An oven-broiler according to claim 22 and further characterized by the end extensions being also tubular and extending downwardly at an angle from a central section of the oven defining the cooking chamber, the vent means comprising shrouds at opposite ends of the oven of configuration conforming to the end sections for at least partially enshrouding and extending beyond the respective entrance and exit for receiving smoke and vapors escaping from the entrance or exit, respectively, and conduit means for carrying such smoke and vapors away from said shrouds.

* * * * *